United States Patent [19]

Eckel et al.

[11] Patent Number: 5,047,496
[45] Date of Patent: Sep. 10, 1991

[54] PROCESS FOR THE PREPARATION OF AROMATIC POLYETHERSULPHONES

[75] Inventors: Thomas Eckel, Dormagen; Karl Fuhr, Krefeld; Karl-Heinz Ott, Leverkusen, all of Fed. Rep. of Germany

[73] Assignee: Bayer Aktiengesellschaft, Leverkusen-Bayerwerk, Fed. Rep. of Germany

[21] Appl. No.: 365,304

[22] Filed: Jun. 13, 1989

[30] Foreign Application Priority Data

Jun. 22, 1988 [DE] Fed. Rep. of Germany ....... 3820959

[51] Int. Cl.$^5$ .......................... C08G 8/02; C08G 8/26; C08G 75/23
[52] U.S. Cl. .................................... 528/171; 528/125; 528/126; 528/127; 528/128
[58] Field of Search ............... 528/125, 127, 126, 128, 528/171

[56] References Cited

U.S. PATENT DOCUMENTS 4,056,511 11/1977 Staniland ............................. 528/125
4,731,429 3/1988 McMaster et al. ................. 528/125

Primary Examiner—John Kight, III
Assistant Examiner—P. Hampton-Hightower
Attorney, Agent, or Firm—Connolly and Hutz

[57] ABSTRACT

This invention relates to a process for the preparation of high molecular weight aromatic polyethersulphones from diphenols and dihalogenoaryls, characterized in that N-alkylated acid amides are used as solvents and at the same time for the azeotropic removal of the water of reaction.

3 Claims, No Drawings

PROCESS FOR THE PREPARATION OF AROMATIC POLYETHERSULPHONES

This invention relates to a process for the preparation of high molecular weight, aromatic polyethersulphones by the reaction of equimolar quantities of diphenols and dihalogenoaryls in a polar, aprotic solvent in the presence of anhydrous alkali metal carbonate, characterised in that a) from 1 to 1.2 mol of alkali metal carbonate is used per mol of diphenol,
b) the polar solvents used are N-alkylated acid amides with boiling points in the range of from 150° C. to 270° C., preferably from 180° C. to 250° C., and
c) the water produced in the reaction is completely removed azeotropically as a mixture of N-alkylated acid amide/water at temperatures from 5° to 20° Centigrade below the boiling point of the N-alkylated acid amide used as solvent without the aid of an additional azeotropic former.

Polymers containing sulphone and ether groups are already known.

According to DE-AS 1 545 106, such polymers are prepared from bis-alkali metal bisphenolates and bis-halogenoaryls in the liquid phase under anhydrous conditions in a sulphoxide or sulphone as solvent, optionally with the aid of chlorobenzene, dichlorobenzene or xylene as co-solvent.

The disadvantage of this process is that the reaction must be carried out under anhydrous conditions, which may in some cases necessitate an expensive procedure for the preparation of the bis-alkali metal bisphenolate (see column 4, line 38 to column 5, line 13 of DE-AS 1 545 106).

According to DE-AS 1 795 725, polysulphones are prepared by heating alkali metal salts of 4-(4-halogenophenylsulphonyl)-phenols corresponding to the following formula

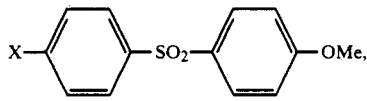

wherein X denotes chlorine or fluorine and Me denotes alkali to a temperature above 150° C. Various polar solvents are suitable for the reaction, both for the formation of the above alkali metal salt and for its subsequent reaction to form the polymeric sulphone (see column 3, lines 5 to 48 of the DE-AS). N-Alkylated acid amides are not mentioned.

A one-stage or two-stage process for the preparation of polyarylene polysulphone polyethers is disclosed in Canadian Patent No. 847 963.

In the said process, alkali metal carbonates are used as base and sulphoxides or sulphones as solvents for the reaction of diphenols with dihalogenoaryls. The water which adheres to the components before the reaction or is formed in the reaction mass may be removed azeotropically by the addition of azeotropic formers such as benzene, xylene, halogenobenzenes, etc. to the reactants so that these are dried before the reaction (page 7, paragraphs 2 and 3 and page 8, paragraph 1 of Canadian Patent No. 847 963). Azeotropic formers may also be present together with the sulphoxide or sulphone solvents during the subsequent formation of polymer and act as co-solvents.

The process according to the present invention, on the other hand, dispenses with the addition of separate azeotropic formers since the N-alkylated acid amides selected as solvents assume the function of the azeotropic formers. This was in no way suggested by the teaching of Ca-PS 847 963.

The preparation of polyarylsulphones is disclosed in DE-OS 1 957 091, in which anhydrous potassium carbonate is again used as base.

The polar solvents used are of the kind which boil at temperatures above 100° C.

Examples of these solvents include sulphones such as diphenylsulphone or diethylsulphone and acid amides such as dimethylacetamide and dimethylformamide. The preferred polar solvent is dimethylformamide. Since two molar portions of potassium carbonate are used per molar portion of bisphenol, the formation of water during the reaction is to a large extent avoided and it is therefore unnecessary to add azeotropic formers. If less than these proportions of potassium carbonate are put into the process, the molecular weight of the end product obtained is lower than required (page 5 of the DE-OS).

The reaction temperatures employed may be in the range of from 80° C. to the boiling point of the solvent and are preferably from 100° C. to 5° Centigrade below the boiling point of the solvent.

Thus when dimethylformamide is used, the reaction temperature is from 80° to 153° C., preferably from 100° to 148° C. No azeotropic distillation is carried out.

The process according to this invention differs from that described above in that N-alkylated acid amides, preferably cyclic acid amides such as N-methylpyrrolidone or N-methylcaprolactam are used as solvents which have boiling points substantially above that of dimethylformamide so that higher reaction temperatures and higher reaction velocities are obtained. Furthermore, the process according to the invention requires only one mol of potassium carbonate per mol of bisphenol and the water formed in the reaction is removed quantitatively from the reaction vessel by azeotropic distillation but without an additional azeotropic former. Neither the use of the preferred N-alkylated cyclic acid amide nor the azeotropic removal of the water of reaction by the solvent itself is in any way suggested by the teaching of DE-OS 1 957 091.

DE-OS 2 731 816 describes the preparation of polyether sulphones by a reaction carried out in polar, aprotic solvents with alkali metal carbonate as base and the use of an additional water-azeotropic former, preferably chlorobenzene. Examples of the polar aprotic solvents used include N-substituted acid amides such as N,N-dimethylformamide, N,N-dimethylacetamide and N-methylpyrrolidone, N-methylpyrrolidone being preferred.

The reaction is carried out stepwise, additional azeotropic former being added in the second reaction stage and removed after removal of the water while polymerisation is stopped in the third, anhydrous polycondensation stage by the addition of methyl chloride. The stepwise procedure according to DE-OS 2 731 816 results in substantially longer reaction times and renders a continuous process of synthesis more difficult. This stepwise method of reaction does not occur in the process according to the invention since the solvent and the azeotropic former are one and the same substance. Removal of the water therefore continuously passes over into the polycondensation proper.

In DE-PS 2 803 873, preparation of the polyethersulphone is carried out with sodium carbonate or bicarbonate and a second alkali metal carbonate or bicarbonate as base and with the aid of solvents. The solvents mentioned include sulphones such as diphenylsulphone, sulpholan and N,N-dimethylformamide or N-methyl-2-pyrrolidone. The preferred solvent is diphenylsulphone (claim 6). The reaction temperatures are in the range of 100° C. to 400° C. and no azeotropic former is added. Azeotropic distillation is not carried out. The preparation of polyethersulphones according to DE-PS 2 803 873 may also be carried out without solvents.

Since azeotropic removal of the water is not carried out in the aforesaid DE-PS, very high temperatures (around 320° C.) are required for obtaining satisfactory molecular weights. This thermal stress on the polyethersulphones may result in substantial discolouration of the products.

In the process according to the present invention, on the other hand, the water formed in the reaction is removed quantitatively as an azeotropic mixture of solvent/water. The procedure is not suggested by the DE-PS.

The process according to the invention is carried out in the temperature range of from 150° to 270° C. and results within short reaction times in polymers with a high molecular weight and light colour.

The use of N-methylcaprolactam as solvent and azeotropic former is not suggested by the DE-PS.

The polyethersulphones obtainable by the process according to the invention preferably have a basic structure consisting of recurrent units of formula (I)

$$-[-O-Z-O-W-]-  \quad (I)$$

wherein
Z denotes the residue of a divalent phenol and
W denotes the residue of the benzoid dihalogen compound with an inert, electron accepting group,
and both residues are attached to the etheroxygen atom by aromatic carbon atoms by means of valency bonds and at least one of the residues Z and/or W provides a sulphone group between aromatic carbon atoms. Polyethersulphones of this type belong to the class of polyarylene-polyether resins described in U.S. Pat. No. 3,264,536.

Particularly preferred diphenols for the preparation of the aromatic polyethersulphones are compounds corresponding to formula (II):

$$HO-Z-OH \quad (II)$$

wherein Z denotes a divalent mononuclear or multinuclear aromatic group containing 6 to 30 carbon atoms and is so constructed that each of the two OH groups is directly attached to a carbon atom of an aromatic system.

Particularly preferred diphenols are compounds corresponding to formula (III):

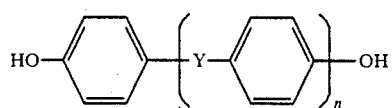

wherein n stands for zero or 1 and Y denotes a single bond, an alkylene or alkylidene group having 1 to 7 carbon atoms, a cycloalkylene or cycloalkylidene group having 5 to 12 carbon atoms, —O—, —S—,

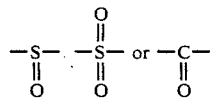

and derivatives thereof which are alkylated or halogenated in the nucleus.

The following are examples of diphenols:
Hydroquinone,
resorcinol,
dihydroxydiphenyls,
bis-(hydroxyphenyl)-alkanes,
bis-(hydroxyphenyl)-cycloalkanes,
bis-(hydroxyphenyl)-ethers,
bis-(hydroxyphenyl)-ketones,
bis-(hydroxyphenyl)-sulphoxides,
bis-(hydroxyphenyl)-sulphones and
α,α'-bis-(hydroxyphenyl)-diisopropylbenzene
and derivatives thereof which are alkylated or halogenated in the nucleus.

The following are the most important diphenols: Hydroquinone, 4,4-dihydroxydiphenyl, 2,2-bis-(4-hydroxyphenyl)-propane, bis-(4-hydroxyphenyl)-methane, 4,4'-dihydroxybenzophenone, 4,4'-dihydroxydiphenylether, 4,4'-dihydroxydiphenylsulphide, 4,4'-dihydroxydiphenyl-sulphone, 1,4-bis-(4-hydroxybenzoyl)-benzene and 1,3-bis-(4-hydroxybenzoyl-)-benzene and derivatives thereof which are substituted in the nucleus, the substituents being preferably CH$_3$, Cl or Br. An example of a derivative which is methylated in the nucleus is 2,2-bis-(4-hydroxy-3,5-dimethylphenyl)-propane.

2,2-Bis-(4-hydroxyphenyl)-propane, 4,4'-dihydroxydiphenyl, 4,4'-dihydroxydiphenylether, hydroquinone, 4,4'-dihydroxydiphenylsulphone, 4,4'-dihydroxybenzophenone and 2,2-bis-(4-hydroxy-3,5-dimethylphenyl)-propane are particularly preferred diphenols.

Mixtures of diphenols may also be used.

Dihalogenoaryls suitable for the process according to the invention are those which contain F, Cl, Br or I atoms as halogen and which are at least dinuclear and contain electron accepting groups. The following are examples: 4,4'-Difluorodiphenylsulphone, 2,4'-difluorodiphenylsulphone, 4,4'-dichlorodiphenylsulphone, 2,4'-dichlorodiphenylsulphone, 1,4-bis-(4'-fluorophenyl-1'-sulphonyl)-benzene, 1,4-bis-(4'-chlorophenyl-1'-sulphonyl)benzene, 1,3-bis-(4'-chlorophenyl-1'-sulphonyl)-benzene, 4,4'-bis-(4''-fluorophenyl-1''-sulphonyl)-diphenyl, 4,4'-bis-(4''-chlorophenyl-1''-sulphonyl)-diphenyl, 4,4'-bis-(4''-fluorophenyl-1''-sulphonyl)-diphenylether and 4,4'-bis-(4''-chlorophenyl-1''-sulphonyl)-diphenylether.

The dihalogen compounds may be used alone or as mixtures.

Dinuclear compounds corresponding to formula (IV):

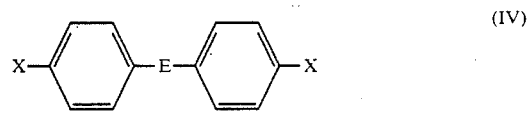

are preferred dihalogenoaryls.

In the above formula (IV), X denotes halogen atoms such as F, Cl, Br or I atoms and E denotes electron accepting groups such as, for example, a sulphone, carbonyl, vinyl, sulphoxide or azo group. Each of the two nuclei may in addition carry one or more substituents selected from saturated hydrocarbons or electron accepting compounds.

4,4'-Dichlorodiphenylsulphone and 4,4'-dichlorobenzophenone are preferred aromatic dihalogen compounds.

N-Alkylated acid amides suitable for this invention are those of $C_1$–$C_{18}$ carboxylic acids and N,N-dialkylamines in which the alkyl groups may have 1 to 4 carbon atoms. Cyclic acid amides of N-$C_1$-$C_4$-alkyl-$\omega$-amino-$C_4$-$C_6$-carboxylic acids are particularly suitable. Dimethylformamide, dimethylacetamide, N-methylpyrrolidone and N-methylcaprolactam are examples of these compounds. N-methylcaprolactam is particularly preferred.

The N-alkylated acid amides are used in quantities from 5 to 100 mol, preferably from 10 to 20 mol, based on 1 mol of diphenol or on 1 mol of dihalogenoaryl compound.

The anhydrous alkali metal carbonates used may be, for example, sodium carbonate or preferably, potassium carbonate. From 1 to 2 mol, preferably from 1.0 to 1.2 mol, of alkali metal carbonate is used per mol of diphenol or per mol of dihalogenoaryl compound.

The process according to the invention may be carried out, for example, by dissolving the diphenols and the dihalogenoaryls in the N-alkylated acid amides in the presence of the alkali metal carbonate, preferably putting all the substances into the process only in the anhydrous state. The resulting reaction mixture is then heated to the boiling point of the system, which may be from about 130° C. to about 265° C. These temperatures of the acid amide/H$_2$O mixtures are about 5° Centigrade to 20° Centigrade below the boiling point of the N-alkylated acid amide put into the process.

The reaction mixture is maintained at this temperature for 0.5 to 4 hours, preferably 1 to 2 hours, until 95 to 100%, preferably 99 to 100%, of the theoretically possible quantity of water has been removed. The acid amide/water mixture may be collected in conventional apparatus such as water separators of various types. The N-alkylated acid amide may also be circulated if the water is removed continuously in conventional drying apparatus.

The water content of the acid amide/water mixture may be determined from the refractive index of the system.

After quantitative removal of the water of reaction, the temperature of the reaction mixture is raised to the boiling point of the N-alkylated acid amide, 150° to 270° C. preferably 180° to 250° C. When this procedure is adopted, the aromatic polyether sulphone is obtained in high yields (>95%) within 0.5 to 10 hours, preferably 1 to 5 hours.

Isolation of the aromatic polyether sulphones may be carried out by various methods. The solid polymer may be separated off by mixing the reaction solution with a precipitating agent such as water and/or methanol, by vigorous stirring or by spraying or atomization. Alternatively, the N-alkylated acid amide may be evaporated. The inorganic components may be removed from the isolated polyethersulphone by suitable methods such as solution or filtration.

The polyether sulphones prepared by the process according to the invention have reduced viscosities (determined at 25° C. in chloroform) of from 0.10 to 1.50 dl/g, preferably from 0.30 to 0.75 dl/g.

The polyethersulphones thus obtained may be used in known manner as moulded products, films, fibres or surface coatings. They may be used as blends with other polymers or they may be used together with fillers of various types.

The high molecular weight, aromatic polyether sulphones obtainable by the process according to the invention may be used technologically, for example in the electrical field (e.g. for contact strips, spool bodies or sideplates), in domestic appliances (e.g. for juice extractors coffee machines, mixers or microwave dishes) and in the motor car industry.

EXAMPLES

Examples 1 to 4 and Comparison Examples 1 to 4 are carried out in N-methylpyrrolidone as N-alkylated acid amide. The total reaction times and reduced viscosities are summarized in Table 1.

EXAMPLE 1

0.25 Mol of 2,2-bis-(4-hydroxyphenyl)-propane (Bisphenol A) and 0.25 mol of 4,4'-dichlorodiphenylsulphone dissolved in 225 ml of N-methylpyrrolidone and 0.275 mol of anhydrous potassium carbonate are introduced under nitrogen into a 1 l three-necked flask equipped with gas inlet tube, glass stirrer, water separator with reflux condenser and internal thermometer. The reaction mixture is heated to the boiling point of the mixture of about 180° C. with stirring. The water of reaction is completely removed from the system by azeotropic distillation within one hour. After removal of the water, the reaction temperature is raised to 190° C., which is 10° Centigrade below the boiling point of the pure N-methylpyrrolidone. The reaction is then continued for about 2 hours, during which the viscosity of the reaction solution rapidly rises.

To work up the reaction product, the reaction solution, which is at a temperature of 60° C., is precipitated into 10 times its quantity of methanol and the fibrous, white polymer obtained is filtered off, washed free from electrolytes with water and dried. The yield is more than 97% of the theoretical yield.

The reduced viscosity of the dried product is determined in chloroform at 25° C. (0.2 g polymer/100 ml CHCl$_3$). It is found to be $\eta_{red}$=0.52 dl/g.

EXAMPLE 2

Example 1 is repeated with 4,4'-dihydroxybiphenyl as dihydroxy compound. A white polymer having a reduced viscosity of $\eta_{red}$=0.49 dl/g is obtained (determined in chloroform at 25° C.).

EXAMPLE 3

Example 1 is repeated with 4,4'-dihydroxydiphenylsulphone as bisphenol. The reduced viscosity of the pure white polymer obtained is $\eta_{red}$=0.40 dl/g (determined at 25° C. in dimethylformamide).

EXAMPLE 4

Example 1 is repeated with tetramethylbisphenol A as dihydroxy compound. The polymer obtained has a reduced viscosity of $\eta_{red}$=0.35 dl/g (determined in chloroform at 25° C.).

COMPARISON EXAMPLE 1

0.25 Mol of 2,2-bis-(4-hydroxyphenyl)-propane, 0.25 mol of 4,4'-dichlorodiphenylsulphone 225 ml of N-methylpyrrolidone, 100 ml of chlorobenzene as additional azeotropic former and 0,275 mol of anhydrous potassium carbonate are introduced under nitrogen into a 1 l three-necked flask equipped with gas inlet tube, glass stirrer, water separator with reflux condenser and internal thermometer. The reaction mixture is heated to 150° C. with stirring. The water of reaction formed is removed quantitatively from the system within 4 hours by azeotropic distillation of the chlorobenzene/water mixture. After removal of the water, the reaction mixture is heated to about 190° C., the chlorobenzene used as azeotropic former is distilled off and stirring is continued at this temperature for 8 to 10 hours.

The product is worked up by a method analogous to that of Example 1. The yield is about 97% of the theoretical yield.

The reduced viscosity of the dried product is determined in chloroform at 25° C. (0.2 g of polymer/100 ml of $CHCl_3$) and is found to be $\eta_{red}=0.52$ dl/g.

COMPARISON EXAMPLE 2

Comparison Example 1 is repeated with 4,4'-dihydroxybiphenyl as dihydroxy compound. A white polymer having a reduced viscosity of $\eta_{red}=0.47$ dl/g is obtained (determined in chloroform at 25° C.).

COMPARISON EXAMPLE 3

Comparison Example 1 is repeated with 4,4'-dihydroxydiphenylsulphone as bisphenol component. The reduced viscosity of the white polymer obtained is $\eta_{red}=0.35$ dl/g (determined at 25° C. in dimethylformamide).

COMPARISON EXAMPLE 4

Comparison Example 1 is repeated with tetramethylbisphenol A as dihydroxy compound. The polymer obtained has a reduced viscosity of $\eta_{red}=0.31$ dl/g (determined in chloroform at 25° C.).

TABLE 1

Synthesis of polyethersulphones in N-methylpyrrolidone as N-alkylated acid amide - comparison of the total reaction times and reduced viscosities of the reaction mixtures with and without additional azeotropic former.

| Example | Total reaction time (hours) | reduced Viscosity (dl/g) | additional azeotropic former |
|---|---|---|---|
| 1 | 3.5 | 0.52 | — |
| 2 | 2.5 | 0.49 | — |
| 3 | 4.5 | 0.40* | — |
| 4 | 5 | 0.35 | — |
| VB 1 | 18 | 0.52 | chlorobenzene |
| VB 2 | 9 | 0.47 | chlorobenzene |
| VB 3 | 15 | 0.35* | chlorobenzene |
| VB 4 | 18 | 0.31 | chlorobenzene |

*determined in dimethylformamide

Examples 5 to 8 and Comparison Examples 5 to 8 are carried out in N-methylcaprolactam as N-alkylated acid amide. The total reaction times and reduced viscosities are summarized in Table 2.

EXAMPLE 5

1.00 Mol of 2,2-bis-(4-hydroxyphenyl)-propane (bisphenol A) and 1.00 mol of 4,4'-dichlorodiphenylsulphone dissolved in 1000 ml of N-methylcaprolactam as well as 1.10 mol of anhydrous potassium carbonate are introduced under nitrogen into a 2 l four-necked flask equipped with gas inlet tube, glass stirrer, water separator with reflux condenser and internal thermometer. The reaction mixture is heated with stirring to the boiling point of the mixture of about 230° C. The water of reaction has been completely removed from the system by azeotropic distillation within 2 hours. During this time, the reaction temperture rises to the boiling point of N-methylcaprolactam of about 240° C. The reaction is then continued at about 235° C. for about 3 hours, during which the viscosity of the reaction solution rapidly rises.

To work up the reaction product, the reaction solution, which is at a temperature of 80° C., is precipitated into 8 times its quantity of water and the fibrous, white polymer obtained is then filtered off, washed free from electrolytes with water and dried. The yield amounts to more than 97% of the theoretical yield.

The reduced viscosity of the dried product is determined in chloroform at 25° C. (0.2 g of polymer/100 ml of $CHCl_3$). It is found to be $\eta_{red}=0.53$ dl/g.

EXAMPLE 6

Example 5 is repeated with 4,4'-dihydroxybiphenyl as bisphenol component. A white polymer with a reduced viscosity of $\eta_{red}=0.59$ dl/g is obtained (determined in chloroform at 25° C.).

EXAMPLE 7

Example 5 is repeated with 4,4'-dihydroxydiphenylsulphone as dihydroxy compound. The reduced viscosity of the white polymer obtained is $\eta_{red}=0.30$ dl/g (determined in dimethylformamide at 25° C.).

EXAMPLE 8

Example 5 is repeated with tetramethylbisphenol A as dihydroxy compound. The polymer obtained has a reduced viscosity of $\eta_{red}=0.30$ dl/g (determined in chloroform at 25° C.).

COMPARISON EXAMPLE 5

1.00 Mol of 2,2-bis-(4-hydroxyphenyl)-propane, 1.00 mol of 4,4'-dichlorodiphenylsulphone, 1000 ml of N-methylcaprolactam, 400 ml of chlorobenzene as azeotropic former and 1.10 mol of anhydrous potassium carbonate are introduced under nitrogen into a 2 l four-necked flask equipped with gas inlet tube, glass stirrer, water separator with reflux condenser and internal thermometer. The reaction mixture is heated to about 142° C. with stirring. The water of reaction is removed quantitatively from the system within 3 hours by azeotropic distillation of the chlorobenzene/water mixture and the chlorobenzene used as azeotropic former is subsequently removed quantitatively from the system in 4 hours. The reaction mixture is then heated to 235° C. and the condensation reaction is carried to completion in 3 hours.

The product is worked up by a procedure analogous to that of Example 5. The yield is more than 97% of the theoretical yield.

The reduced viscosity of the dried product is determined in chloroform at 25° C. (0.2 g of polymer/100 ml of $CHCl_3$) and is found to be $\eta_{red}=0.53$ dl/g.

COMPARISON EXAMPLE 6

Comparison Example 5 is repeated with 4,4'-dihydroxydiphenyl as dihydroxy compound. A white polymer having a reduced viscosity of $\eta_{red}=0.53$ dl/g is obtained (determined in chloroform at 25° C.).

COMPARISON EXAMPLE 7

Comparison Example 5 is repeated with 4,4'-dihydroxydiphenylsulphone as bisphenol component. The reduced viscosity of the white polymer obtained is $\eta red=0.28$ dl/g (determined in dimethylformamide at 25° C.).

COMPARISON EXAMPLE 8

Comparison Example 5 is repeated with tetramethylbisphenol A as dihydroxy compound. The polymer obtained has a reduced viscosity of $\eta_{red}=0.30$ dl/g (determined in chloroform at 25° C.).

TABLE 2

Synthesis of polyethersulphones in N-methyl caprolactam as solvent - comparison of total reaction times and reduced viscosities of reaction mixtures with and without additional azeotropic former.

| Example | Total reaction time (h) | Reduced viscosity (dl/g) | additional azeotropic former |
|---|---|---|---|
| 5 | 5 | 0.53 | — |
| 6 | 5 | 0.59 | — |
| 7 | 5 | 0.30* | — |
| 8 | 5 | 0.30 | — |
| VB 5 | 10 | 0.53 | chlorobenzene |
| VB 6 | 10 | 0.53 | chlorobenzene |
| VB 7 | 10 | 0.28* | chlorobenzene |
| VB 8 | 10 | 0.30 | chlorobenzene |

*determined in dimethylformamide

We claim:

1. Process for the preparation of high molecular weight aromatic polyethersulphones consisting essentially of recurrent units of formula

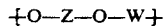

wherein —Z— denotes a divalent mononuclear or multinuclear aromatic group containing 6 to 30 carbon atoms, and W denotes

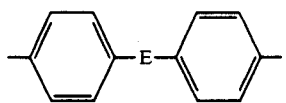

wherein E is an electron accepting sulphone, carbonyl, vinyl, sulphoxide or azo group, and wherein both —Z— and —W— are attached to the ether oxygen atom by aromatic carbon atoms by means of covalent bonds and at least one of Z or W provides a sulphone group between aromatic carbon atoms, said process comprising reacting equimolar quantities of diphenols of the formula

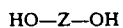

and dihalogen aryls of the formula

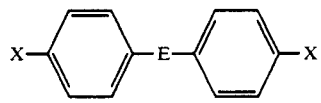

wherein X is halogen, in the presence of 1 to 1.2 mol of alkali metal carbonate per mol of diphenol and in the presence of cyclic N-alkylated acid amide solvent with a boiling point in the range of 180° to 250° C., and wherein water formed in the reaction is completely removed azeotropically as a cyclic N-alkylated acid amide/water mixture at temperatures from 5° to 20° Centigrade below the boiling point of the cyclic N-alkylated acid amide solvent without an additional azeotropic former.

2. Process according to claim 1 wherein the solvent is N-methylpyrrolidone.

3. Process according to claim 1 wherein the solvent is N-methylcaprolactam.

* * * * *